United States Patent
Brageul

(10) Patent No.: US 9,961,642 B2
(45) Date of Patent: May 1, 2018

(54) REDUCED POWER CONSUMING MOBILE DEVICES METHOD AND APPARATUS

(71) Applicant: Intel Corporation, Santa Clara, CA (US)

(72) Inventor: David Brageul, Toulouse (FR)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 15/282,051

(22) Filed: Sep. 30, 2016

(65) Prior Publication Data

US 2018/0098277 A1   Apr. 5, 2018

(51) Int. Cl.
| | |
|---|---|
| H04W 52/02 | (2009.01) |
| G10L 15/08 | (2006.01) |
| G10L 15/22 | (2006.01) |
| H04W 4/00 | (2009.01) |
| H04B 1/3827 | (2015.01) |

(52) U.S. Cl.
CPC ........... *H04W 52/028* (2013.01); *G10L 15/08* (2013.01); *G10L 15/22* (2013.01); *H04B 1/385* (2013.01); *H04W 4/008* (2013.01); *G10L 2015/088* (2013.01); *G10L 2015/223* (2013.01)

(58) Field of Classification Search
CPC ...... G10L 15/30; H04W 52/028; H04W 4/008
See application file for complete search history.

(56) References Cited

U.S. PATENT DOCUMENTS

| | | | | |
|---|---|---|---|---|
| 6,671,292 B1* | 12/2003 | Haartsen | ............... | H04J 3/0632 |
| | | | | 370/412 |
| 9,437,188 B1* | 9/2016 | Medina | ................... | G10L 15/08 |
| 9,502,028 B2* | 11/2016 | Nandy | ................. | G10L 19/002 |
| 9,712,923 B2* | 7/2017 | Furst | ..................... | H04R 17/02 |
| 2007/0288239 A1* | 12/2007 | Russell | ................ | G10L 15/193 |
| | | | | 704/257 |

(Continued)

FOREIGN PATENT DOCUMENTS

| | | | | |
|---|---|---|---|---|
| EP | 3067884 A1 * | 9/2016 | ............... | G06F 1/32 |
| WO | WO2015-102467 A1 | 7/2015 | | |

OTHER PUBLICATIONS

International Search Report and Written Opinion dated Nov. 27, 2017 for International Patent Application No. PCT/US2017/048242, 14 pages.

(Continued)

*Primary Examiner* — Brian L Albertalli
(74) *Attorney, Agent, or Firm* — Schwabe, Williamson & Wyatt, P.C.

(57) ABSTRACT

Apparatus and method to facilitate power consumption reduction in one or both of a first and second device are disclosed herein. In some embodiments, the first device may include one or more antennas that is to receive first audio data captured by the second device; and one or more processors in communication with the one or more antennas. The one or more processors is to identify a first energy level associated with the first audio data, determine, in accordance with the first energy level, a size of a buffer to be updated in the second device to capture second audio data, and detect whether one or more key phrases is included in the first audio data, which may be repeated depending on the no, one, or more key phrases detected.

18 Claims, 12 Drawing Sheets

(56) References Cited

U.S. PATENT DOCUMENTS

| | | | | |
|---|---|---|---|---|
| 2011/0305343 A1* | 12/2011 | Lee | ............ | G06F 3/162 |
| | | | | 381/22 |
| 2012/0059655 A1* | 3/2012 | Cartales | ............ | G10L 15/30 |
| | | | | 704/251 |
| 2012/0246352 A1 | 9/2012 | Lim | | |
| 2013/0103392 A1* | 4/2013 | Son | ............ | G10L 19/16 |
| | | | | 704/201 |
| 2014/0163978 A1* | 6/2014 | Basye | ............ | G10L 15/28 |
| | | | | 704/233 |
| 2014/0241540 A1* | 8/2014 | Hodges | ............ | H04M 1/6066 |
| | | | | 381/74 |
| 2014/0348345 A1* | 11/2014 | Furst | ............ | H04R 3/00 |
| | | | | 381/111 |
| 2015/0039303 A1* | 2/2015 | Lesso | ............ | G10L 15/28 |
| | | | | 704/233 |
| 2016/0232899 A1 | 8/2016 | Chen et al. | | |
| 2016/0253997 A1* | 9/2016 | Kerr | ............ | G10L 15/28 |
| | | | | 381/110 |
| 2016/0284363 A1 | 9/2016 | Von Borstel et al. | | |
| 2017/0133041 A1* | 5/2017 | Mortensen | ............ | G10L 25/78 |

OTHER PUBLICATIONS

Claude Desset et al., "Energy Savings for Wireless Terminals through Smart Vertical Handover", In: Communications, 2009, ICC '009, IEEE International Conference on, pp. 1-5, Jun. 14-18, 2009.

* cited by examiner

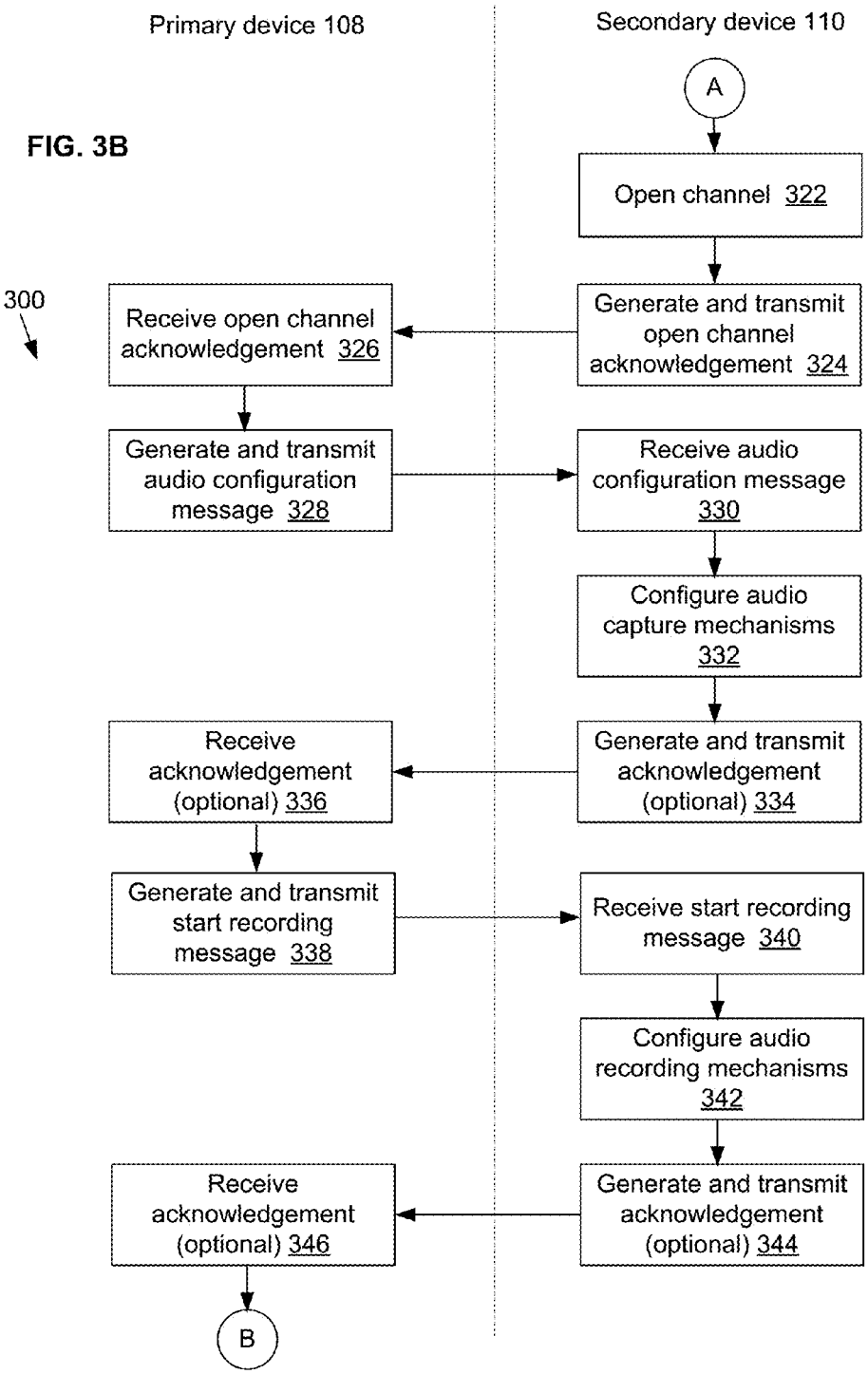

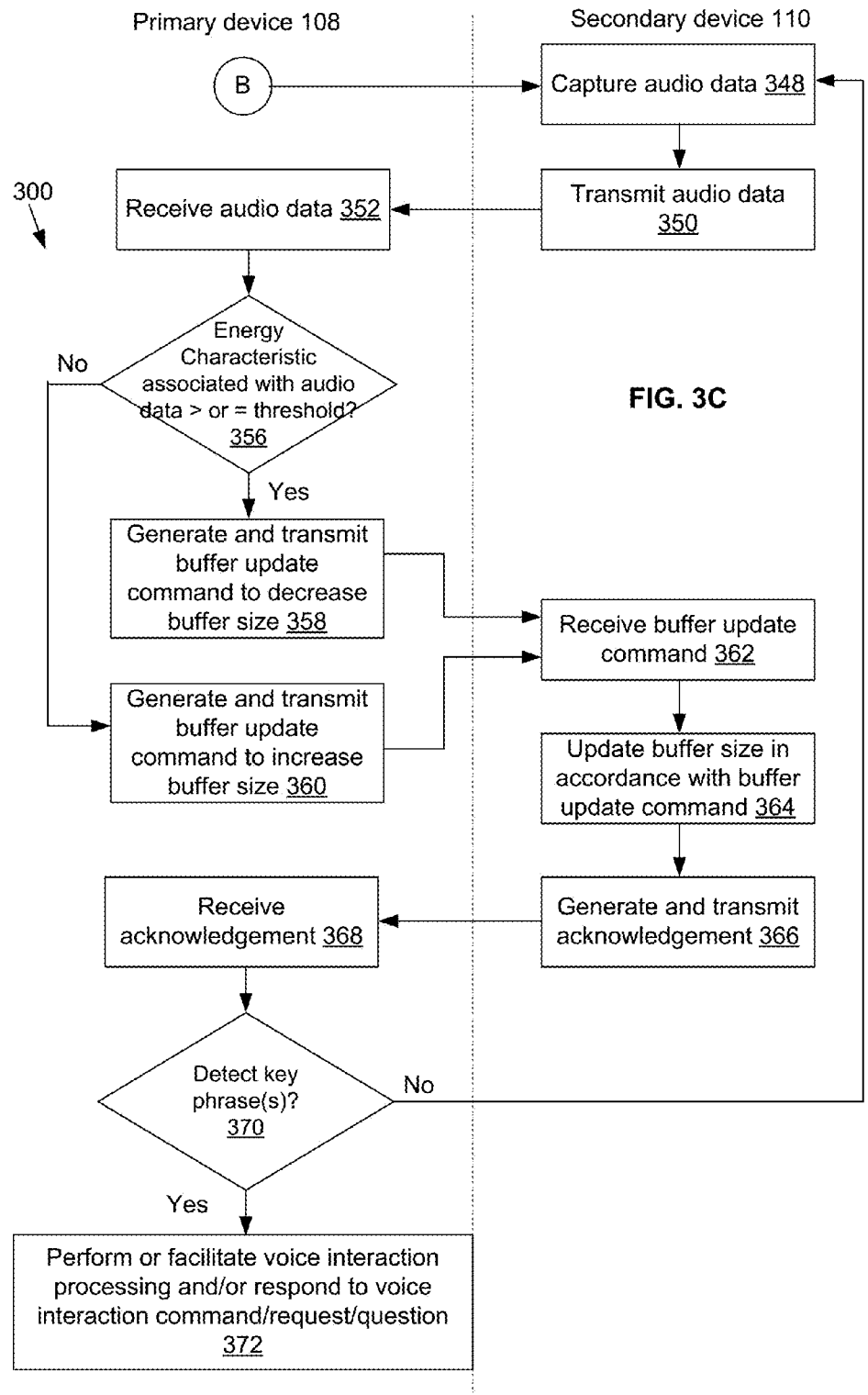

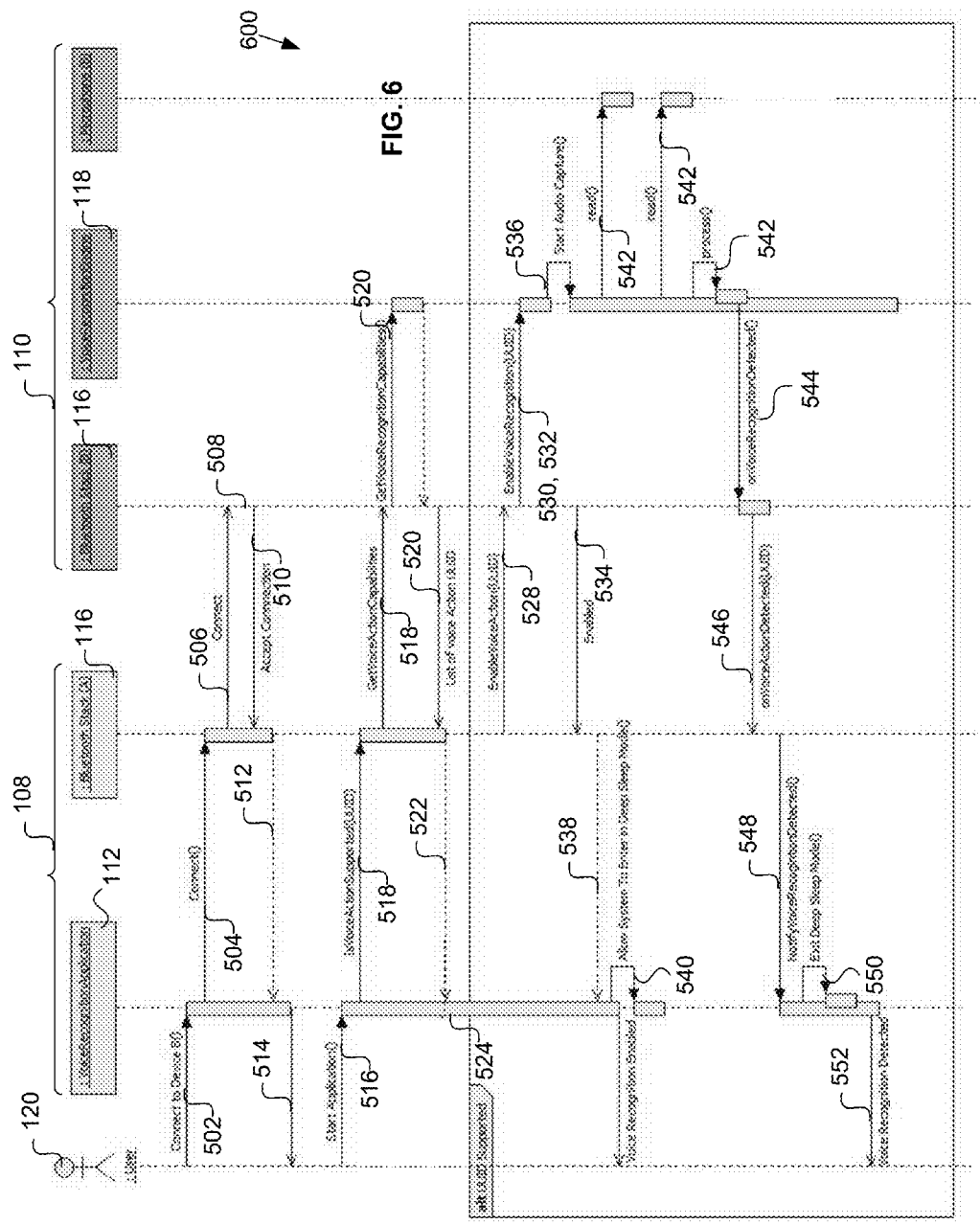

Non-transitory computer-readable storage medium
802

Programming Instructions 804
configured to cause a computer device, in response to execution of the programming instructions, to practice one or more operations of the methods described in reference to Figures 1-6.

FIG. 8

REDUCED POWER CONSUMING MOBILE DEVICES METHOD AND APPARATUS

FIELD OF THE INVENTION

The present disclosure relates generally to the technical fields of computing and communication, and more particularly, to reducing power consumption of computing systems.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Mobile devices, such as smartphones, tablets, and wearable devices, have proliferated in recent years. Certain classes of mobile devices, such as smartphones, may be capable of functionalities that may not be possible in other classes of mobile devices, such as wearable devices. Nevertheless, wearable devices may be worn by users and, thus, may be more readily accessible to users than, for example, handheld or nearby devices. To take advantage of the benefits of more than one class of devices, for example, a wearable device may be coupled to a handheld or nearby device via a wireless connection. Then the user may wear the wearable device and have access to one or more functionalities of the handheld/nearby device to which the wearable device may be coupled.

However, in order to have access to and/or use functionalities of both devices, one or both devices may have certain power requirements. In some instances, the power requirements for one and/or both devices may be more than if the devices are not coupled to each other. In order to extend the battery life of mobile devices, it may be beneficial to reduce power consumption even when wirelessly coupled to each other.

BRIEF DESCRIPTION OF THE DRAWINGS

Embodiments will be readily understood by the following detailed description in conjunction with the accompanying drawings. The concepts described herein are illustrated by way of example and not by way of limitation in the accompanying figures. For simplicity and clarity of illustration, elements illustrated in the figures are not necessarily drawn to scale. Where considered appropriate, like reference labels designate corresponding or analogous elements.

FIGS. 3A-3C depict an example process to practice the present disclosure, according to some embodiments.

FIG. 6 depicts an example timing diagram relating to the process of FIGS. 5A-5C, according to some embodiments.

FIG. 8 illustrates an example non-transitory computer-readable storage media having instructions configured to practice all or selected ones of the operations associated with the processes described herein, according to some embodiments.

DETAILED DESCRIPTION

Figure 1:
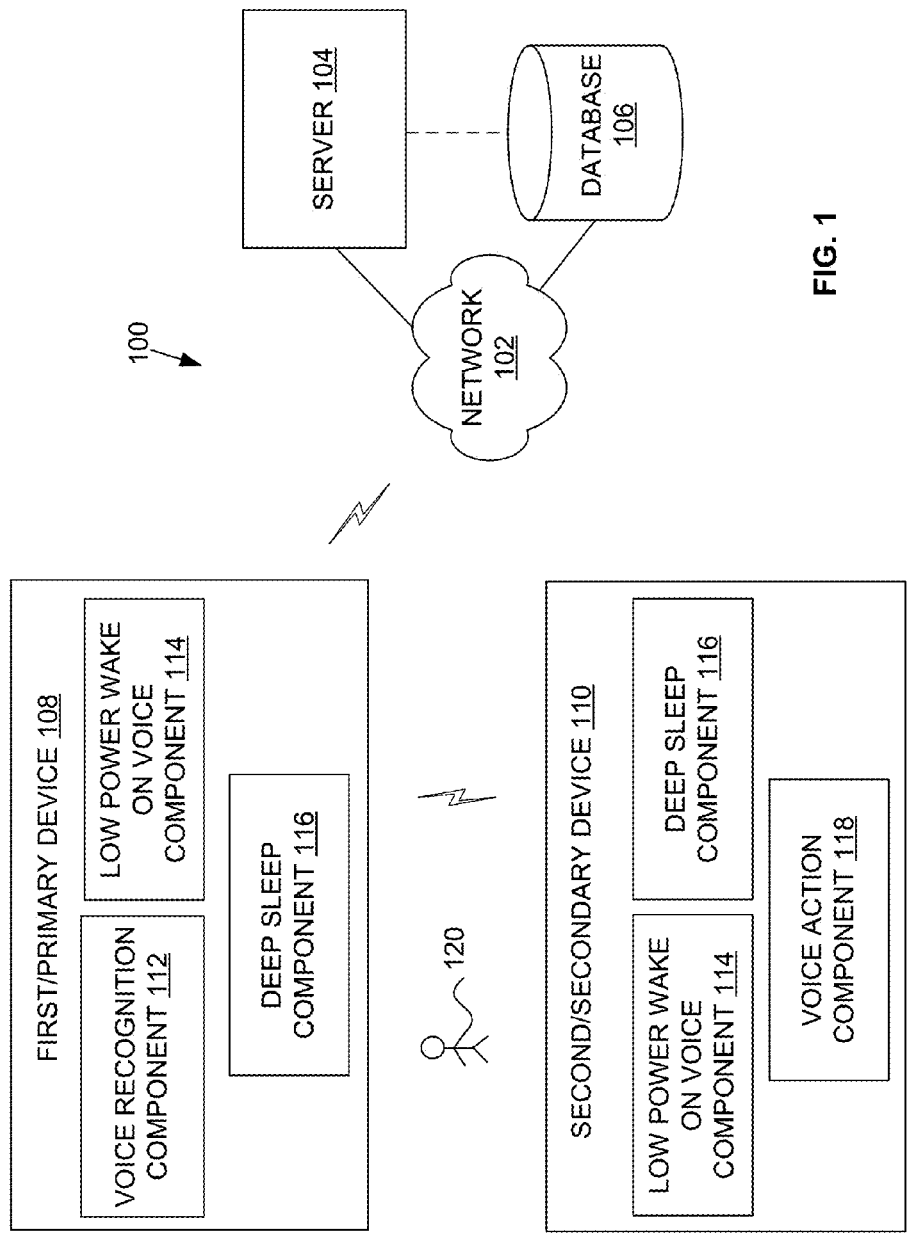
FIG. 1 depicts a block diagram illustrating a network view of an example system incorporated with the power consumption reduction technology of the present disclosure, according to some embodiments.

Embodiments of apparatuses and methods related to implementing reduced power consuming mobile devices are described. In some embodiments, a first device may include one or more antennas that is to receive first audio data captured by a second device; and one or more processors in communication with the one or more antennas. Wherein the one or more processors is to identify a first energy level associated with the first audio data, determine, in accordance with the first energy level, a size of a buffer to be updated in the second device to capture second audio data, and detect whether one or more key phrases is included in the first audio data, and wherein, when there is no detection of the one or more key phrases, the one or more processors is to determine, in accordance with second energy level associated with the second audio data, the size of the buffer to be updated in the second device to capture third audio data. These and other aspects of the present disclosure will be more fully described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C).

Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 depicts a block diagram illustrating a network view of an example system 100 incorporated with the power consumption reduction technology of the present disclosure, according to some embodiments. System 100 may include a network 102; a server 104; a database 106; a primary device 108; and a secondary device 110. One or more of the server 104, database 106, primary device 108, and secondary device 110 may communicate with the network 102. Primary device 108 and second device 110 may be incorporated with the power consumption reduction technology of the present disclosure to facilitate reduced power consumption by one or both of the primary and secondary devices 108, 110, as described more fully below.

Network 102 may comprise one or more wired and/or wireless communications networks. Network 102 may include one or more network elements (not shown) to physically and/or logically connect computer devices to exchange data with each other. In some embodiments, network 102 may be the Internet, a wide area network (WAN), a personal area network (PAN), a local area network (LAN), a campus area network (CAN), a metropolitan area network (MAN), a virtual local area network (VLAN), a cellular network, a carrier network, a WiFi network, a WiMax network, and/or the like. Additionally, in some embodiments, network 102 may be a private, public, and/or secure network, which may be used by a single entity (e.g., a business, school, government agency, household, person, and the like). Although not shown, network 102 may include, without limitation, servers, databases, switches, routers, gateways, base stations, repeaters, software, firmware, intermediating servers, and/or other components to facilitate communication.

Server 104 may comprise one or more computers, processors, cellular infrastructure, network infrastructure, back haul infrastructure, or servers to facilitate communication between and among primary device 108, secondary device 110, and a plurality of other devices (not shown) and/or functionalities of the primary device 108, secondary device 110, and other devices (not shown). For example, server 104 may facilitate voice interaction activities and/or functionalities, as described more fully below. In some embodiments, server 104 may communicate with database 106 (directly or indirectly via network 102), primary device 108, and/or secondary device 110, via network 102. In some embodiments, server 104 may include one or more web servers, one or more application servers, one or more intermediating servers, and the like.

Database 106 may comprise one or more storage devices to store data and/or instructions for use by server 104, primary device 108, and/or secondary device 110. For example, database 106 may include data to facilitate voice interaction. The content of database 106 may be accessed via network 102 and/or directly by the server 104. The content of database 106 may be arranged in a structured format to facilitate selective retrieval. In some embodiments, database 106 may comprise more than one database. In some embodiments, database 106 may be included within server 104.

Primary device 108 may comprise one or more wired and/or wireless communication computing devices in communication with server 104 (via network 102) and/or secondary device 110. Primary device 108 may also be referred to as a main device, first device, master device, or the like. Primary device 108 may comprise, without limitation, one or more work stations, personal computers, general purpose computers, laptops, Internet appliances, hand-held devices, wireless devices, Internet of Things (IoT) devices, wearable devices, set top boxes, appliances, vehicles, wired devices, portable or mobile devices, cellular or mobile phones, portable digital assistants (PDAs), smart phones, tablets, multi-processor systems, microprocessor-based or programmable consumer electronics, game consoles, set-top boxes, network PCs, mini-computers, and the like.

Secondary device 110 may comprise one or more wired and/or wireless communication computing devices in communication with server 104 (via network 102) and/or primary device 108. Secondary device 110 may also be referred to as a second device, slave device, auxiliary device, wearable device, or the like. Secondary device 110 may comprise, without limitation, one or more devices having fewer functionalities or features, smaller size, smaller form factor, fewer components, and/or lower price than the primary device 108; Internet devices; hand-held devices; wireless devices; Internet of Things (IoT) devices; wearable devices; portable or mobile devices; smartwatches; wireless earbuds; wireless headsets; cellular or mobile phones; types of devices different from the primary device 108; and the like.

In some embodiments, primary device 108 and secondary device 110 may include hardware, firmware, circuitry, software, and/or other executable instructions to facilitate various aspects of the techniques described herein. For example, primary device 108 may include one or more antennas and transceivers to facilitate short range communication (e.g., Bluetooth communication) with the secondary device 110, one or more antennas and transceivers to facilitate long range communication (such as with network 102), one or more processors such as a digital signal processor (DSP), a voice recognition component 112, a low power wake on voice component 114, and/or a deep sleep component 116. As another example, secondary device 110 may include one or more antennas and transceivers to facilitate short range communication (e.g., Bluetooth communication) with the primary device 108, one or more processors such as a DSP, one or more microphones to receive or capture audio associated with a user 120, low power wake on voice component 114, deep sleep component 116, and/or a voice action component 118.

In some embodiments, primary device 108 may comprise a smartphone or a tablet, and secondary device 110 may comprise a small, robust, and/or wearable device having fewer features or functionalities than primary device 108 (e.g., a smartwatch) or a device different from a smartphone or tablet. Secondary device 110 may be more proximate and/or accessible to the user 120 than primary device 108 at least during the times in which embodiments of the reduced power consumption techniques of the present disclosure may be practiced. In some embodiments, primary device 108 may be capable of long range wireless communication (e.g., cellular or WiFi), and each of the primary and secondary devices 108, 110 may be capable of short range wireless communication (e.g., Bluetooth) similar or compatible with each other. In some embodiments, secondary device 110 may obtain audio data associated with the user 120, such as sounds or words spoken by the user 120 in connection with voice interaction action/activity, and the captured audio data may trigger short range communication between the primary and secondary devices 108, 110 as well as associated processing at one or both of the primary and secondary devices 108, 110 to provide voice interaction functionalities to the user 120, to be described more fully below.

In some embodiments, primary device 108 may include the voice recognition component 112 to provide voice interaction functionalities. In connection with voice interaction activities, the low power wake on voice component 114 included in both the primary and secondary devices 108, 110 may be configured to provide selective analysis and dynamic control of communication of audio data from the secondary device 110 to the primary device 108, so as to reduce power consumption in one or both of the primary and secondary devices 108, 110.

In other embodiments, primary device 108 may include the voice recognition component 112 to provide voice interaction functionalities. Nevertheless, deep sleep component 116 included in both the primary and secondary devices 108, 110 may be configured to place the primary device 108 in a deep sleep mode and maintain the primary device 108 in deep sleep mode until the audio data captured by the secondary device 110 is determined to include a recognizable voice action. The voice action component 118 may be configured to provide at least limited voice action recognition capabilities at the secondary device 110. In this manner, power consumption by at least the primacy device 108 may be reduced, and the overall power consumption by the primary and secondary devices 108, 110 may be less than if both devices are in active mode in order to provide voice interaction in accordance with audio data captured by the secondary device 110.

In some embodiments, primary device 108 may include all or a subset of the components 112, 114, 116 and/or secondary device 110 may include all or a subset of the components 114, 116, 118. For example, primary device 108 may include voice recognition component 112 and low power wake on voice component 114, and secondary device 110 may include the low power wake on voice component 114. In another example, primary device 108 may include voice recognition component 112 and deep sleep component 116, and secondary device 110 may include the deep sleep component 116 and voice action component 118. In still another example, primary device 108 may include components 112, 114, and 116, and secondary device 110 may include components 114, 116, and 118.

In some embodiments, any of components 112, 114, 116, and/or 118 (or a portion thereof) may be implemented as software comprising one or more instructions to be executed by one or more processors included in respective primary device 108 and/or secondary device 110. In some embodiments, the one or more instructions comprising the components 112, 114, 116, and/or 118 may be stored and/or executed in a trusted execution environment (TEE) of respective primary device 108 and/or secondary device 110. In some embodiments, the TEE may be included in a dedicated core of respective primary device 108 and/or secondary device 110. In alternative embodiments, the components 112, 114, 116, and/or 118 (or a portion thereof) may be implemented as firmware or hardware such as, but not limited to, an application specific integrated circuit (ASIC), programmable array logic (PAL), field programmable gate array (FPGA), and the like included in the respective primary device 108 and/or secondary device 110. In some embodiments, components 112, 114, 116, and/or 118 may be implemented as software in one of the primary device 108 or secondary device 110 and implemented as hardware in the other one of the primary device 108 or secondary device 110, or vice versa.

In some embodiments, low power wake on voice component 114 and/or deep sleep component 116 may comprise Bluetooth profiles or portions of Bluetooth profiles. In some embodiments, components 114 and/or 116 may be used and/or compatible with Bluetooth low energy stacks. In some embodiments, voice action component 118 may comprise a subset of features of the voice recognition component 112.

Figure 2:
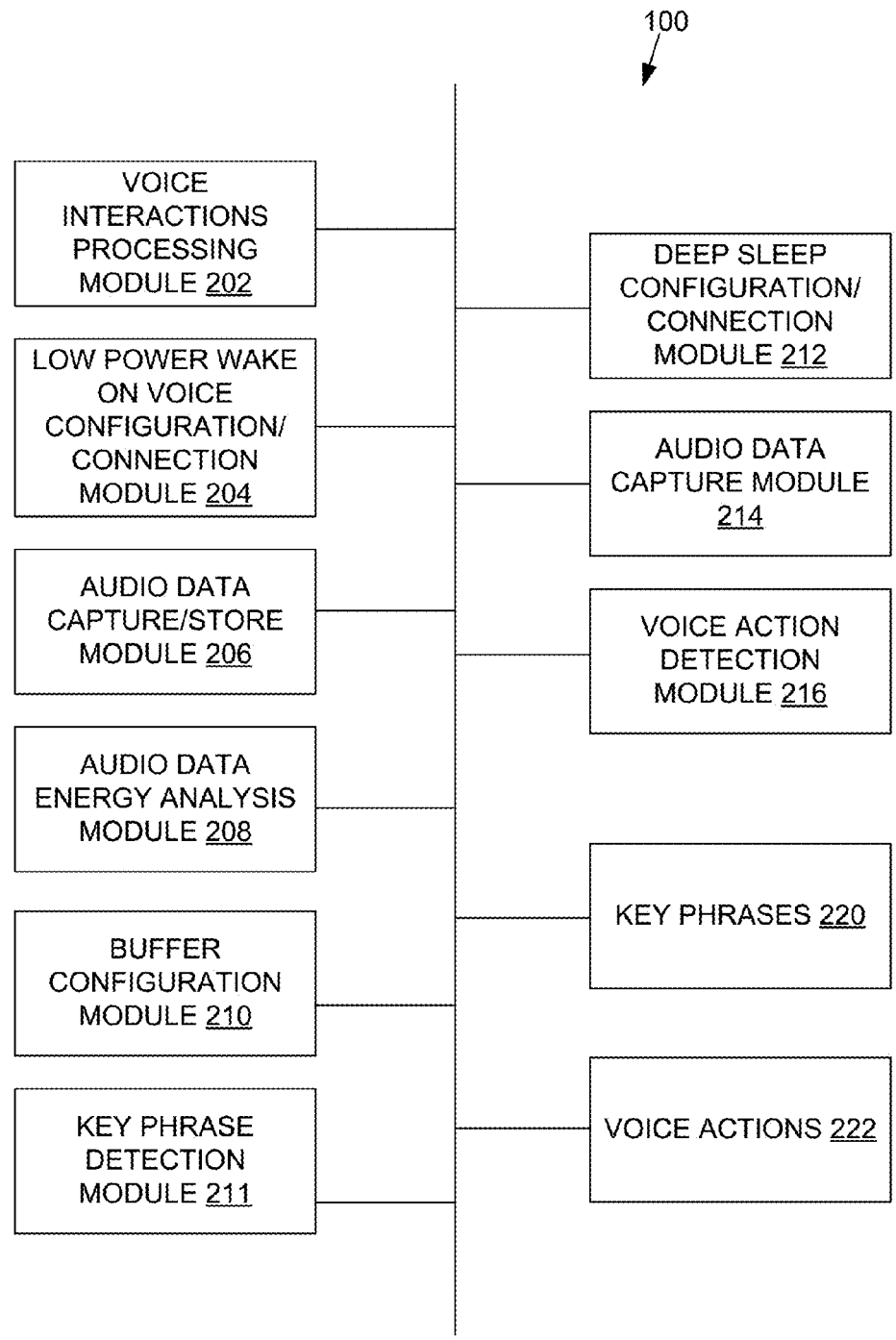
FIG. 2 depicts an example block diagram illustrating a logical view of the system of FIG. 1, the block diagram illustrating algorithmic structures and data associated with the processes performed by the algorithmic structures, according to some embodiments.

FIG. 2 depicts an example block diagram illustrating a logical view of the system 100, the block diagram illustrating algorithmic structures and data associated with the processes performed by the algorithmic structures, according to some embodiments. FIG. 2 illustrates example modules and data that may be included and/or used by the components 112, 114, 116, and/or 118 to provide voice interaction while having dynamically reduced power consumption by one or both of the primary and secondary devices 108, 110, according to some embodiments. The various modules and/or data shown in FIG. 2 may be implemented at least partially by hardware at one or more computing devices, such as one or more hardware processors executing instructions stored in one or more memories for performing various functions described herein. The modules and/or data may be communicatively coupled (e.g., via appropriate interfaces) to each other and to various data sources, so as to allow information to be passed between the modules and/or to share and access common data. FIG. 2 illustrates only one of many possible arrangements of modules and data configured to perform the functionalities described herein. Other arrangements may include fewer or different modules and/or data, and the division of work between the modules and/or data may vary depending on the arrangement. In some embodiments, modules 202-216 may comprise one or more software components, programs, applications, or other units of code base or instructions configured to be executed by one or more processors, or may comprise one or more firmware or hardware components or circuitry, included in the primary device 108 and/or secondary device 110. Although modules 202-216 may be depicted as distinct components in FIG. 2, modules 202-216 may be implemented as fewer or more components than illustrated.

In some embodiments, voice interactions processing module 202 may be configured to facilitate voice interaction actions or activities associated with the user 120. Module 202 may be included in the voice recognition component 112 (also referred to as a voice recognition application, voice recognition app, voice interaction application, or voice interaction app), and may control interfacing with the server 104 (as necessary), for instance, to respond to the voice action requested made by the user 120 or take an action that is responsive to the user request. In some embodiments, voice recognition, voice action detection, or detection of key phrases included in the voice command or question made by the user 120 may be performed by the voice interactions processing module 202. Upon initiation of voice interaction by the user 120, the module 202 may be configured to trigger one or more functionalities of the low power wake on voice configuration/connection module 204.

In some embodiments, the low power wake on voice configuration/connection module 204 may be configured to open a Bluetooth low energy channel between the primary and secondary devices 108, 110; configure audio settings in one or both of the primary and secondary devices 108, 110 (e.g., configure a microphone included in the secondary device 110); and configure and/or initiate capture of audio by the secondary device 110. An audio data capture/store module 206 may be configured to facilitate sound capture, configuration of audio data packets associated with captured sound, and transmission of audio data packets to the primary device 108 (via a short range wireless communication protocol such as Bluetooth). Audio data energy analysis module 208 may be configured to determine energy characteristics associated with the audio data packets, such as determination of an energy level associated with respective audio data packets. For example, if the user 120 has not made any sounds, the corresponding audio data packet may include little or no audio content, and thus, its energy level may be low. Conversely, if the user 120 speaks words in rapid succession, the corresponding audio data packet may include considerable audio content and corresponding energy level may be high.

In response to the energy characteristic of the current audio data packet determined by the module 208, a buffer configuration module 210 may determine an update to a size of a buffer included in the secondary device 110, in which the buffer may be where audio data that has been captured and which is to be transmitted to the primary device 108 may be stored. In some embodiments, the size of the buffer may determine how often a transmission of audio data may be made from the secondary device 110 to the primary device 108. The size of the buffer to be updated may pertain to capture of successive audio data. A key phrase detection module 211 may be configured to detect or identify one or more key phrases included in the current audio data packet. A library or repository of key phrases and associated parameters (collectively referred to as key phrases 220) may be used by the module 211 to perform the key phrase detection.

If one or more key phrases have been detected, then further processing and/or actions responsive to the particular user voiced command, request, or question may be performed by the voice interactions processing module 202. If no key phrase has been detected and/or the detected key phrase(s) indicate that additional voice interaction may be forthcoming, then the next audio data packet captured at the secondary device 110 may be transmitted to the primary device 108. In some embodiments, determination of energy level associated with the current audio data packet, determination of the size of the buffer to be updated for the next audio data packet, and detection of key phrases may be performed iteratively until a particular voice interaction action or activity has been completed.

In some embodiments, upon initiation of voice interaction by the user 120, voice interactions processing module 202 may be configured to actuate a deep sleep configuration/connection module 212. Module 212, in turn, may be configured to check whether the secondary device 110 may be capable of handling at least some of the voice recognition functionalities such as detection of the voice action(s) made by the user 120. If such functionality is supported by the secondary device 110, then module 212 may be configured to enable or initiate voice action detection functionality in the secondary device 110 (e.g., enable voice action detection module 216) and place the primary device 108 in a deep sleep mode or state, in which the primary device 108 may exit the deep sleep mode or state upon command by the secondary device 110.

With the primary device 108 in deep sleep mode, an audio data capture module 214 may facilitate capture of audio (e.g., user voice commands, questions, or request) using a microphone included in the secondary device 110. The voice action detection module 216, at the secondary device 110, may be configured to process the captured audio and determine whether one or more recognizable voice actions may be detectable within the captured audio. In some embodiments, a library or repository of voice actions and associated parameters (collectively referred to as voice actions 222) may be accessed by module 216 in order to make the determination. In some embodiments, voice action detection may be similar or different from key phrase detection. If voice action(s) are detected, then the deep sleep configuration/connection module 212 may be configured to notify the primary device 108 of the detected voice action(s) and request/command the primary device 108 to exit deep sleep mode. Once the primary device 108 is out of deep sleep mode, voice interactions processing module 202 at the primary device 108 may be configured to perform further processing and/or other functions responsive to the detected voice action(s).

In some embodiments, modules 204-211 may be included in the low power wake on voice component 114. In other embodiments, modules 204-210 may be included in component 114 and module 211 may be included in component 112. In some embodiments, modules 212-214 may be included in the deep sleep component 116, and module 216 may be included in the voice action component 118.

Figure 3A:
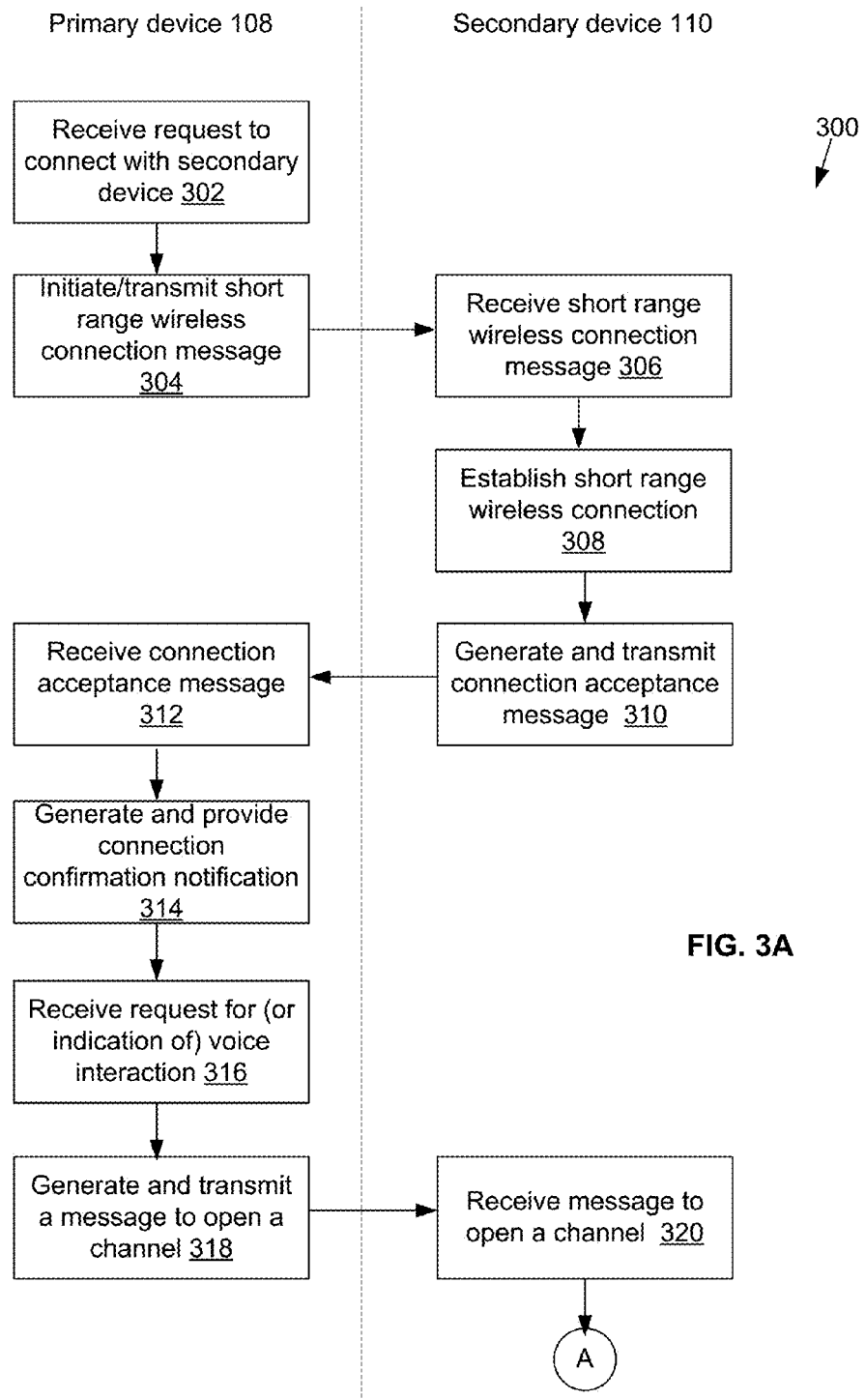
Figure 4:
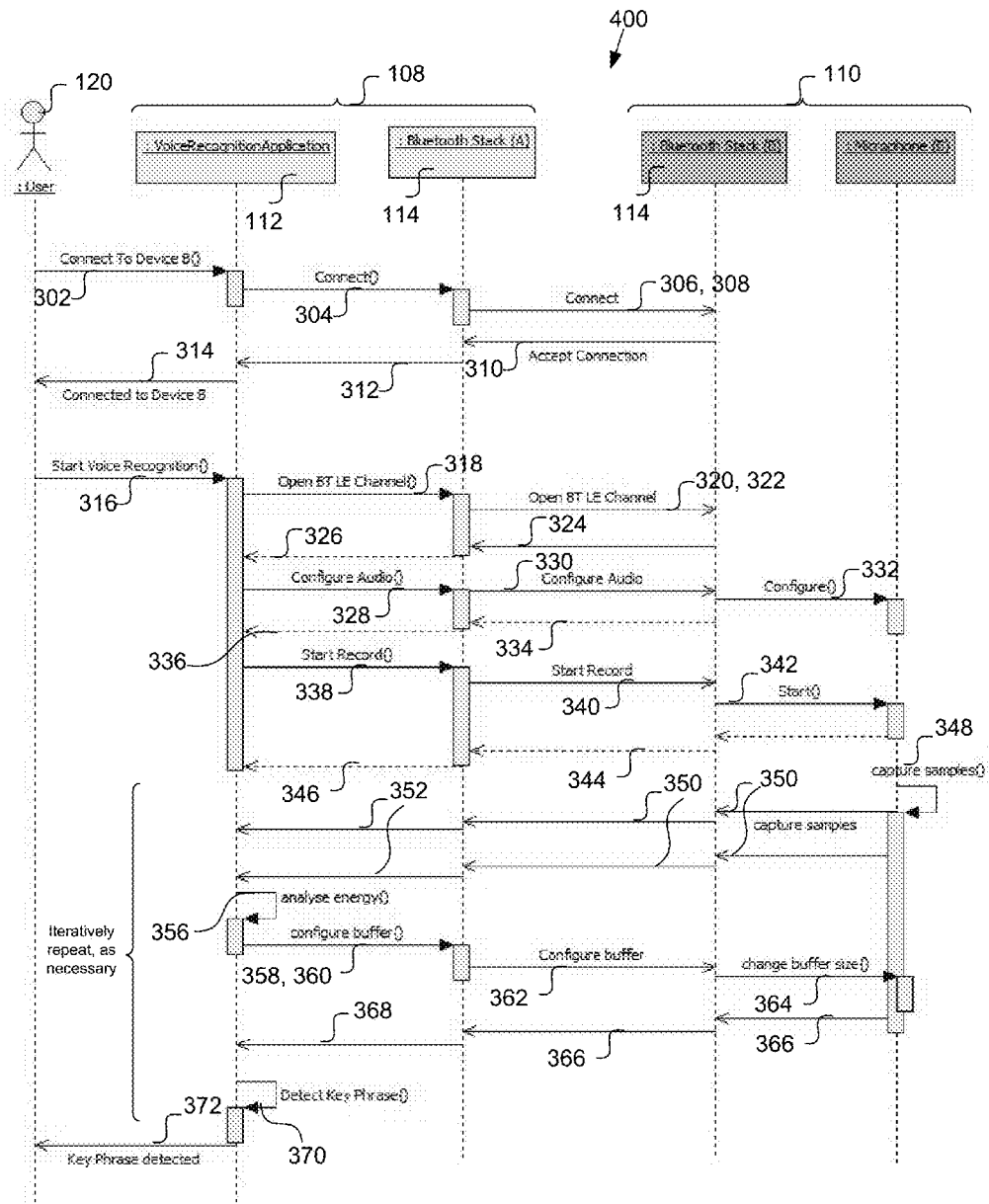
FIG. 4 depicts an example timing diagram relating to the process of FIGS. 3A-3C, according to some embodiments.

FIGS. 3A-3C depict an example process 300 that may be performed and/or facilitated by components 112 and 114 to reduce power consumption associated with one or both of primary and secondary devices 108, 110, according to some embodiments. FIG. 4 depicts an example timing diagram 400 relating to the process of FIGS. 3A-3C, according to some embodiments.

At a block 302 in FIG. 3A, the voice interactions processing module 202 at the primary device 108 may receive a request or some indication from the user 120 to couple or connect the primary device 108 and secondary device 110 to each other. For example, the user 120 may initiate a Bluetooth connection between devices 108 and 110, in which the primary device 108 may serve as the master and the secondary device 110 may serve as a slave. In response, at a block 304, the voice interactions processing module 202 at the primary device 108 may initiate a short range wireless connection (e.g., Bluetooth connection) with the secondary device 110 by transmitting a connection message. In some embodiments, establishing a short range wireless connection may be performed by other connection protocols or applications, instead of module 202, included in the primary device 108.

The transmitted connection message may be received by the secondary device 110, at a block 306, and, in turn, the secondary device 110 may establish the short range wireless connection at a block 308. Once the connection has been established, the secondary device 110 may generate and transmit a connection acceptance, completion, or confirmation message, at a block 310. Such connection acceptance/completion/confirmation message may be received by the primary device 108, at block 312. Next, in some embodiments, primary device 108 may provide to the user 120, such as on a display included in the primary device 108, a notification providing confirmation of the established connection.

In some embodiments, at a block 316, the user 120 may request or otherwise indicate an interest in initiating voice interaction. For example, the user 120 may open a voice interaction app included in the primary or secondary device 108, 110, or the user 120 may speak a trigger word or key phrase (e.g., "Ok Google," "Hey Siri," "Hello Cortana," "Alexa," etc.). In response, the voice interactions processing module 202 in conjunction with the low power wake on voice configuration/connection module 204 at the primary device 108 may be configured to prepare the secondary device 110 to capture audio associated with the voice interaction activity to be performed. At a block 318, modules 202 and/or 204 at the primary device 108 may generate and transmit a message to open a channel compatible with the short range wireless connection established with respect to blocks 302-314, such as a Bluetooth low energy (LE) channel. This channel may be used, as described in greater detail below, for the primary device 108 to provide commands to the secondary device 110 and for the secondary device to forward captured audio data associated with the user 120 to be processed by the primary device 108. The message transmitted in block 318 may be received by the low power wake on voice configuration/connection module 204 included in the secondary device 110, at a block 320.

In response to the open channel message received in block 320, module 204 included in the secondary device 110 may be configured to appropriately configure and open a channel in a block 322 (see FIG. 3B). Once the channel has been opened, at a block 324, module 204 at the secondary device 110 may generate and transmit an acknowledgment of the opened channel to the primary device 108. And, correspondingly, module 204 included in the primary device 108 may receive the acknowledgement at a block 326.

With an appropriate channel opened between the primary and secondary devices 108, 110, the low power wake on voice configuration/connection module 204 of the primary device 108 may generate and transmit an audio configuration message, at a block 328. In some embodiments, the audio configuration message may specify one or more parameters associated with capturing audio data associated with voice interaction requests, commands, and/or questions to be made by the user 120. For instance, the audio configuration message may command a (particular) microphone included in the secondary device 110 to be in an active mode, for the (particular) microphone to be configured in a certain format or state, command starting and/or stopping recording sounds, and the like.

Next at a blocks 330 and 332, respectively, the low power wake on voice configuration/connection module 204 included in the secondary device 110 may receive the audio configuration message, and configure at least audio capture mechanisms included in the secondary device 110 (e.g., a microphone) in accordance with the audio configuration message. With audio capture mechanisms appropriately configured, the low power wake on voice configuration/connection module 204 in the secondary device 110 may generate and transmit an acknowledgement pertaining to completed configuration, at a block 334. The acknowledgement, in turn, may be received by the primary device 108 at a block 336. In some embodiments, blocks 334 and 336 may be optional.

Next at a block 338, the low power wake on voice configuration/connection module 204 in the primary device 108 may be configured to generate and transmit a start recording message to the secondary device 110. In some embodiments, the start recording message may instruct the secondary device 110 to start storing or recording the sounds received by the microphone included in the secondary device 110, where the received sounds are to be stored (e.g., a particular audio buffer included in the secondary device 110), an initial size of a memory to be allocated for storing the received sounds (e.g., initial size of the audio buffer), possible processing of the received sounds, and/or the like. Upon receipt of the start recording message at the secondary device 110, the low power wake on voice configuration/connection module 204 included in the secondary device 110 may configure audio recording mechanisms (e.g., audio buffer) in accordance with the received start recording message, at a block 342. Upon completion of audio recording mechanism configuration, module 204 included in the secondary device 110 may generate and transmit an acknowledgement (block 344), which may be received by the primary device 108 (block 346). In some embodiments, blocks 344 and 346 may be optional.

Next, at a block 348 (see FIG. 3C), the audio data capture/store module 206 included in the secondary device 110 may be configured to capture sounds (also referred to as audio data) using the microphone at the secondary device 110. The captured audio data may then be transmitted as a data packet (also referred to as an audio data packet), at block 350, to be received by the primary device 108, at block 352. In some embodiments, the audio data may comprise sounds, words or phrases spoken by the user 120, or other audio that may be received by the microphone. As such, the audio data may include whole or a portion of trigger words/phrases (e.g., "ok Google"); one or more voice interaction requests, commands, or questions (e.g., "what is today's weather?," "set an alarm for 15 minutes," "call Larry"); noise; and/or no vocalization by the user 120.

In some embodiments, the audio data energy analysis module 208 included in the primary device 108 may analyze the received audio data (also referred to as the current audio data or current audio data packet) to determine one or more energy characteristics associated with the received audio data. The energy level of the received audio data may comprise an example energy characteristic. In some embodiments, if the energy characteristic (e.g., energy level) associated with the received audio data is greater than or equal to a threshold (yes branch of block 356), then the buffer configuration module 210 in the primary device 108 may determine an update to the size of the buffer to be implemented in the secondary device 110, in which the next audio data may be captured and stored (block 358). The update to the size of the buffer may comprise decreasing the size relative to the current size of the buffer (e.g., a "small" buffer size). Conversely, if the energy characteristic associated with the received audio data is less than a threshold (no branch of block 356), then the buffer configuration module 210 in the primary device 108 may determine an update to the size of the buffer to be implemented in the secondary device 110 that may be to increase the size relative to the current size of the buffer (e.g., a "large" buffer size) (black 360). As an example, the size of the buffer to be updated that may be deemed to be a "small" buffer size may be capable of storing a few milliseconds (ms) worth of sound, such as 20 ms. The size of the buffer to be updated that may be deemed to be a "large" buffer size may be capable of storing several hundreds of ms of sound.

In alternative embodiments, rather than updating the buffer size to be a "small" or "large" buffer size, the buffer size may be updated to a size that may be inversely proportional to the amount of the energy present in the received audio data, within a fix range of the buffer size. In any case, updating the buffer size to a smaller size may improve reactivity of the system 100 to voice interaction intent by the user 120, because energy present within the received audio data (or energy above a threshold or other sufficient trigger) may be indicative of audio content, as opposed to no or little audio content, currently being provided by the user 120 and which may continue in the next time period. Conversely, if there is little energy present within the received audio data (or energy may be below a threshold or otherwise deemed to be insubstantial), this may be indicative of there being little or no audio content being provided by the user 120 (e.g., user 120 has not spoken any words). Hence, the next audio data to be captured may likewise contain little or no audio content and the buffer may capture successive audio data for a longer time period, because the buffer size may be increased, before forwarding the captured audio data to the primary device 108. By increasing the buffer size relative to the current buffer size, the time to next audio data transfer to the primary device 108 may be later in time than would otherwise would be, which may lead to savings in power at least associated with data transmission from fewer number of data transmissions.

The update to the buffer size may be included in a buffer update command generated by the buffer configuration module 210. The module 210 may also facilitate transmission of the buffer update command to the secondary device 110, from either block 358 or 360. The buffer update command may be received by the secondary device 110 at a block 362. At a block 364, the buffer configuration module 210 included in the secondary device 110 may update or reconfigure the size of the (audio) buffer of the secondary device 110 in accordance with the received buffer update command. At a block 366, the buffer configuration module 210 of the secondary device 110 may generate and transmit an acknowledgement of the buffer reconfiguration to the primary device 108. And at a block 368, the primary device 108 may receive the acknowledgement.

In some embodiments, the key phrase detection module 211, in conjunction with the voice interactions processing module 202, may analyze the received audio data in order to determine or detect whether one or more key phrases from among the plurality of key phrases 220 may be present within the received audio data, at a block 370. If at least one key phrase is detected (yes branch of block 370), then the voice interactions processing module 202 may perform or facilitate further processing for voice interaction (e.g., such as accessing resource(s) over the network 102); provide a response to the user 120 to the voice interaction command, request, or question posed by the detected key phrase(s); and/or otherwise perform an action or activity related to the voice interaction command, request, or question (block 372).

If no key phrase is detected (no branch of block 370), then process 300 may return to block 348 to capture the next audio data packet, perform energy characteristic analysis on the next audio data packet to dynamically update the buffer size, and the like as described in detail above. Successive capture of audio data in a dynamically modified audio buffer may be iteratively repeated until one or more key phrases are detected so that one or more appropriate voice interaction actions or activities may be carried out.

In some embodiments, one or more of the communications between the primary and secondary devices 108, 110, such as transmission of the audio data in block 350 or transmission of the buffer update command in block 358 or 360, may be performed using the Bluetooth LE channel opened/established in block 322.

Figure 5A:
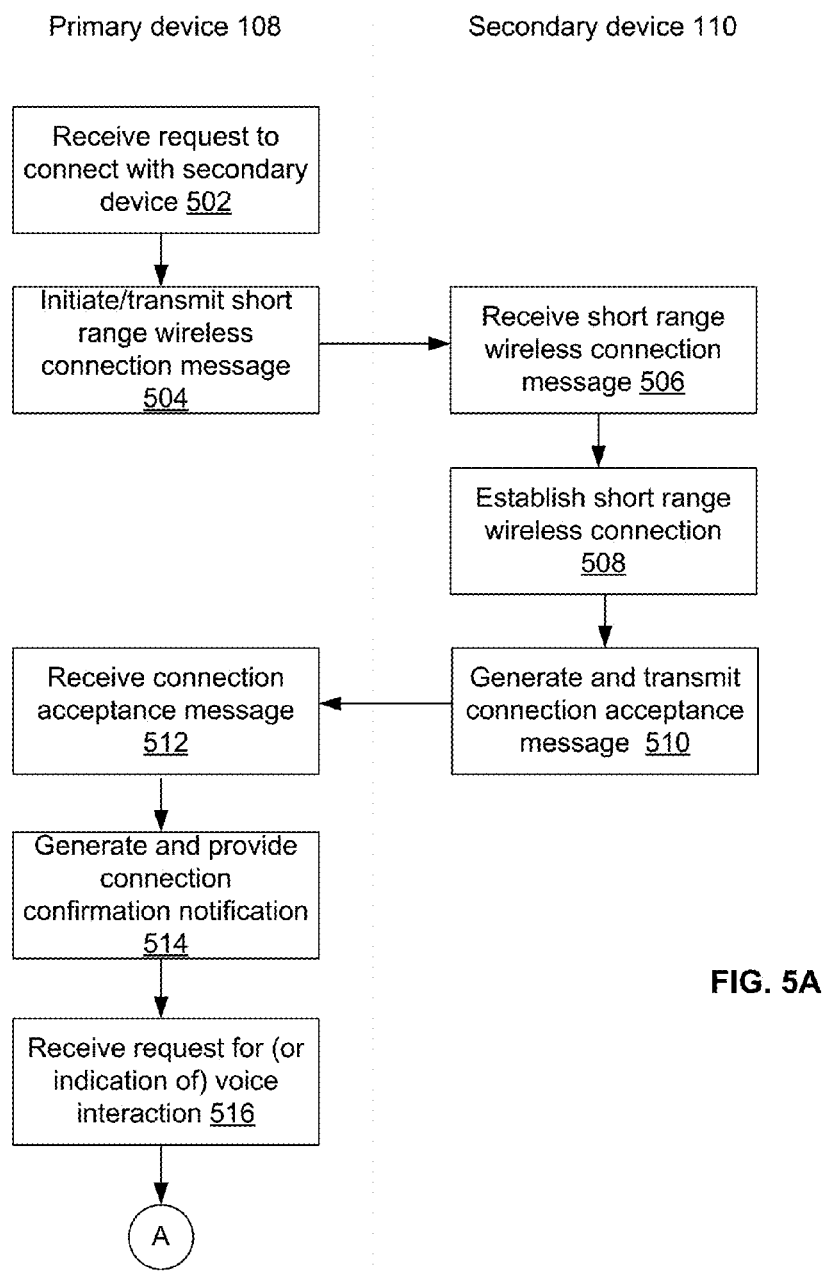
FIGS. 5A-5C depict another example process to practice the present disclosure, according to some embodiments.
Figure 5B:
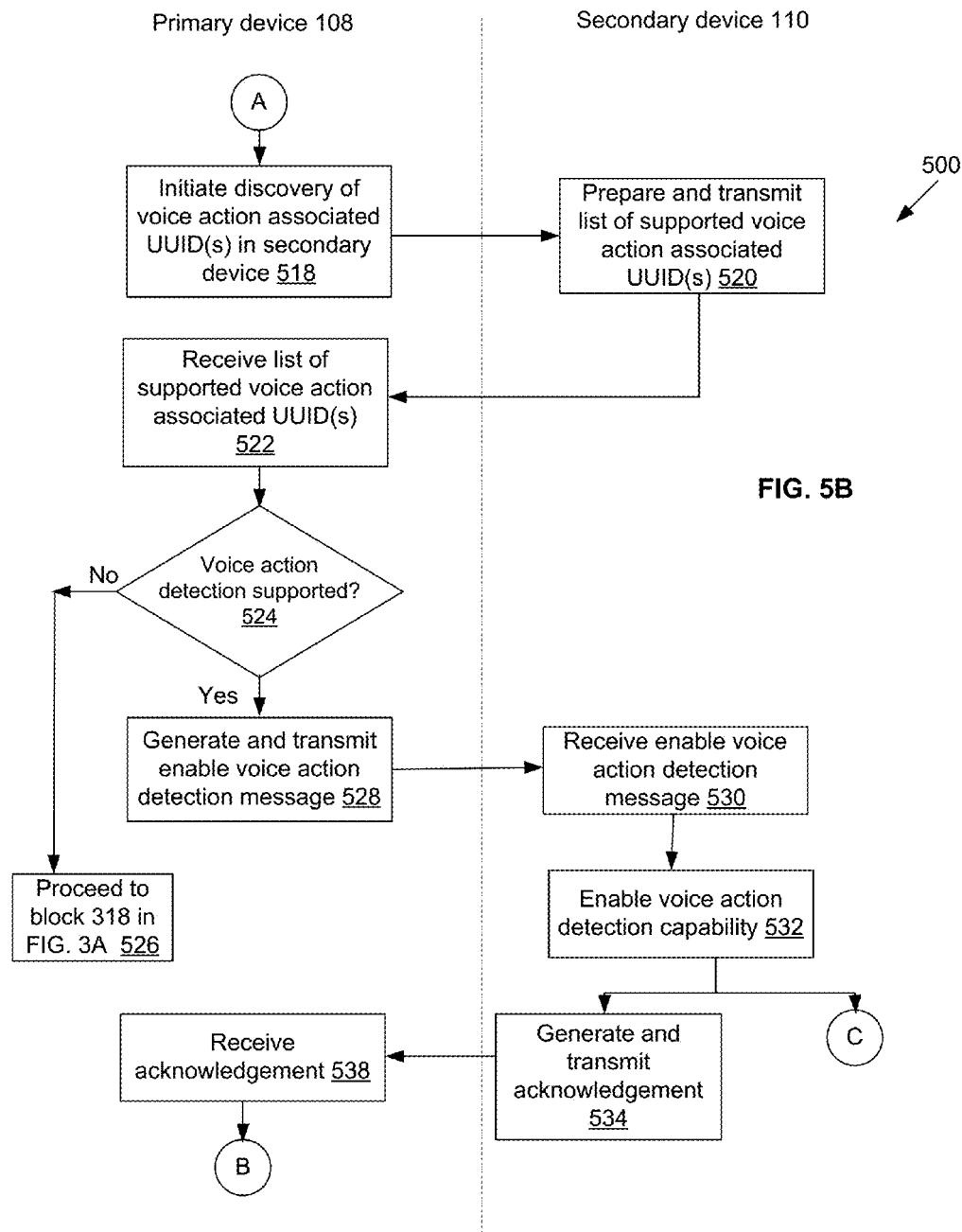
Figure 5C:
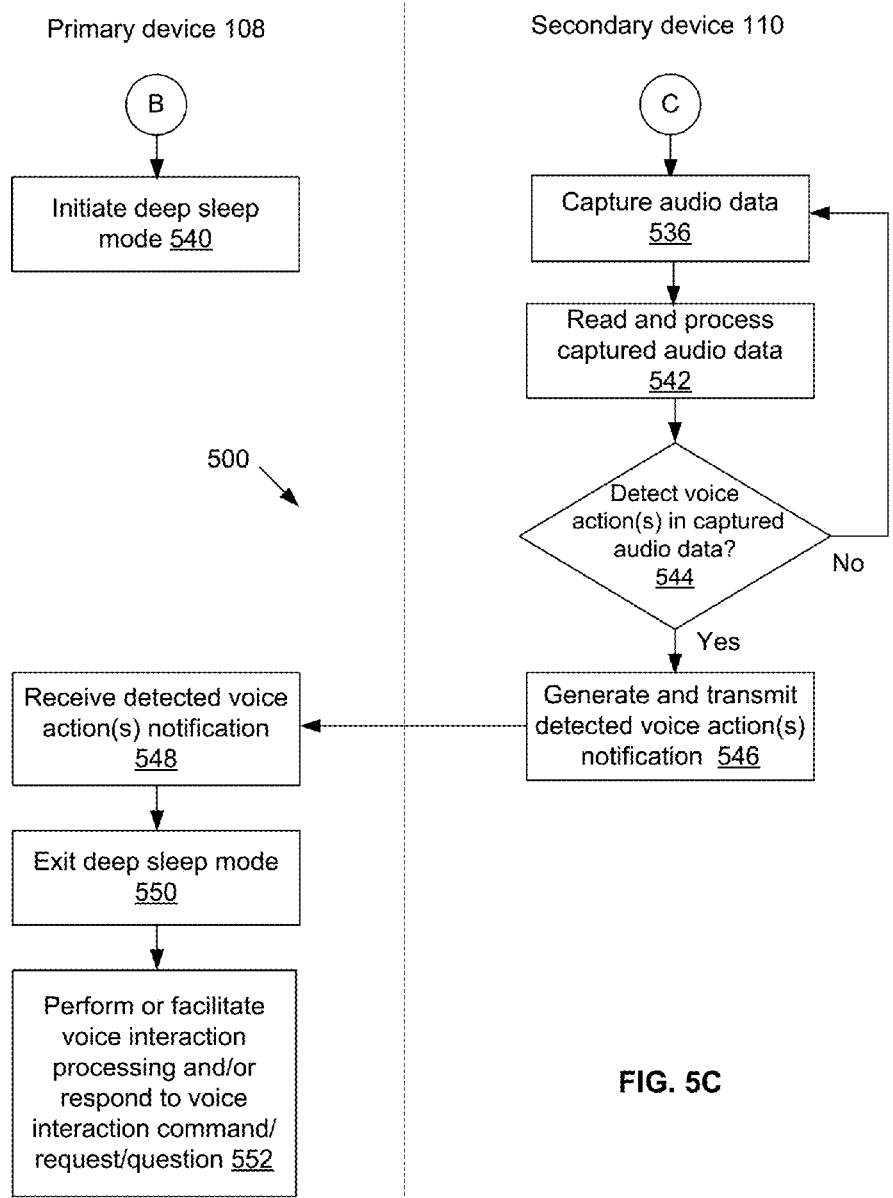

FIGS. 5A-5C depict an example process 500 that may be performed and/or facilitated by components 112, 116, and 118 to reduce power consumption of at least the primary device 108, according to some embodiments. FIG. 6 depicts an example timing diagram 600 relating to the process of FIGS. 5A-5C, according to some embodiments. In some embodiments, processes 300 and 500 may be performed independently of each other. In other embodiments, processes 300 and 500 may be performed in conjunction with each other as described in detail below.

In FIG. 5A, blocks 502-516 may be similar to respective blocks 302-316 of process 300, according to some embodiments. Next, the deep sleep configuration/connection module 212 included in the primary device 108 may initiate discovery of voice action associated universally unique identifiers (UUIDs) for the secondary device 110, at a block 518 (see FIG. 5B). Each particular voice action may be associated with a unique UUID. Block 518 may comprise discovering or finding out the services offered by or available at the secondary device 110, which in some embodiments may comprise services associated with voice action or voice recognition capabilities. In alternative embodiments, block 518 may be performed by a service discovery protocol (SDP) associated with the Bluetooth specification.

In response to the discovery request, at a block 520, the deep sleep configuration/connection module 212 included in the secondary device 110 may prepare and transmit a list of the supported voice action associated UUID(s) to the primary device 108. Upon receipt of the list by the primary device 108, the deep sleep configuration/connection module 212 in conjunction with the voice interactions processing module 202 in the primary device 108 may check the list to determine whether voice recognition capabilities associated with voice action detection are supported by the secondary device 110 at a block 524.

If the secondary device 110 does not include voice recognition capabilities associated with voice action detection (no branch of block 524), then voice recognition, key phrase detection, and other capabilities associated with voice interaction processing may be provided by the primary device 108. Nevertheless, power consumption savings may be possible in one or both of the primary and secondary devices 108, 110 by proceeding to block 318 in FIG. 3A, at a block 526. Alternatively, process 500 may end instead of proceeding to block 526.

If the secondary device 110 includes voice recognition capabilities associated with voice action detection (yes branch of block 524), then at least some of the voice interaction processing may be performed by the secondary device 110 rather than the primary device 108, in some embodiments. Hence, the deep sleep configuration/connection module 212 included in the primary device 108 may generate and transmit an enable voice action detection message, at a block 528.

Next at a block 530, the enable voice action detection message may be received by the secondary device 110. And at a block 532, deep sleep configuration/connection module 212 included in the secondary device 110 may enable voice action detection capabilities at the secondary device 110 in accordance with the enable voice action detection message. In some embodiments, such enablement may include putting the voice action detection module 216 included in the secondary device 110 in an active mode.

At a block 534, the deep sleep configuration/connection module 212 included in the secondary device 110 may generate and transmit an acknowledgement of the enablement completion to the primary device 108. And in turn, at a block 538, the primary device 108 may receive the acknowledgement. Upon receipt of the acknowledgement, the deep sleep configuration/connection module 212 included in the primary device 108 may initiate or place the primary device 108 in a deep sleep mode, at a block 540 (see FIG. 5C). Power consumption by the primary device 108 may now be reduced or minimized.

Once the voice action detection capabilities in the secondary device 110 have been enabled in block 532, the audio data capture module 214 included in the secondary device 110 may start capturing audio data associated with the user 120 using a microphone included in the secondary device 110, at a block 536. Audio data may be captured and stored in an audio buffer (such as the buffer discussed above in connection with process 300) at block 536.

The captured audio data may be read and processed by the audio data capture module 214 included in the secondary device 110, at a block 542, in preparation of performing voice recognition and/or detection of voice action(s) present within the captured audio data. In some embodiments, block 542 may be performed at set time intervals, when the buffer is full to a certain extent, and/or when other pre-set criteria may be reached.

If the voice action detection module 216 included in the secondary device 110 does not detect any voice (interaction) actions, triggers, commands, requests, and/or questions to be performed is present in the captured audio data, using the voice actions 222 and/or key phrases 220 (no branch of block 544), then process 500 may return to block 536. In some embodiments, the voice (interaction) actions, triggers, commands, requests, and/or questions may comprise one or more key phrases (e.g., "Ok Google," "Hello Siri, etc.) and/or one or more voice actions (e.g., "call Mum," "take a picture," "what is today's weather," etc.).

If the voice action detection module 216 included in the secondary device 110 detects one or more voice (interaction) actions, triggers, commands, requests, and/or questions to be performed is present in the captured audio data, using the voice actions 222 and/or key phrases 220 (yes branch of block 544), then the voice action detection module 216 in conjunction with the deep sleep configuration/connection module 212 included in the secondary device 110 may generate and transmit a detected voice action(s) notification (also referred to a voice recognition detected notification), at a block 546. In some embodiments, the detected voice action(s) notification may include information associated with the detected voice (interaction) actions, triggers, commands, requests, and/or questions (collectively may be referred to as voice actions); identifier(s) that may specify what voice action(s) were detected; a notification of the detection; the captured audio data; and/or the like.

Next at a block 548, the primary device 108 may receive the detected voice action(s) notification. Once such a notification has been received, the deep sleep configuration/connection module 212 included in the primary device 108 may exit or end deep sleep mode for the primary device 108, at a block 550. Then at a block 552, the voice interactions processing module 202 included in the primary device 108 may perform or facilitate further processing for voice interaction (e.g., such as accessing resource(s) over the network 102); provide a response to the user 120 to the detected voice action(s); and/or otherwise perform an action or activity in accordance with the detected voice action(s).

In this manner, at least some of the voice interaction processing functionalities, which may conventionally be handled by the primary device 108, may be offloaded to the secondary device 110 that also captures the audio associated with the voice interaction from the user 120. Because the secondary device 110 may be capable of handling at least some of the voice interaction processing functions, the primary device 108 may be placed into and remain in deep sleep mode (or similar low power consumption mode) until at least a voice interaction action or activity to be performed has been articulated by the user 120 (and is recognizable or detectable by the secondary device 110).

Figure 7:
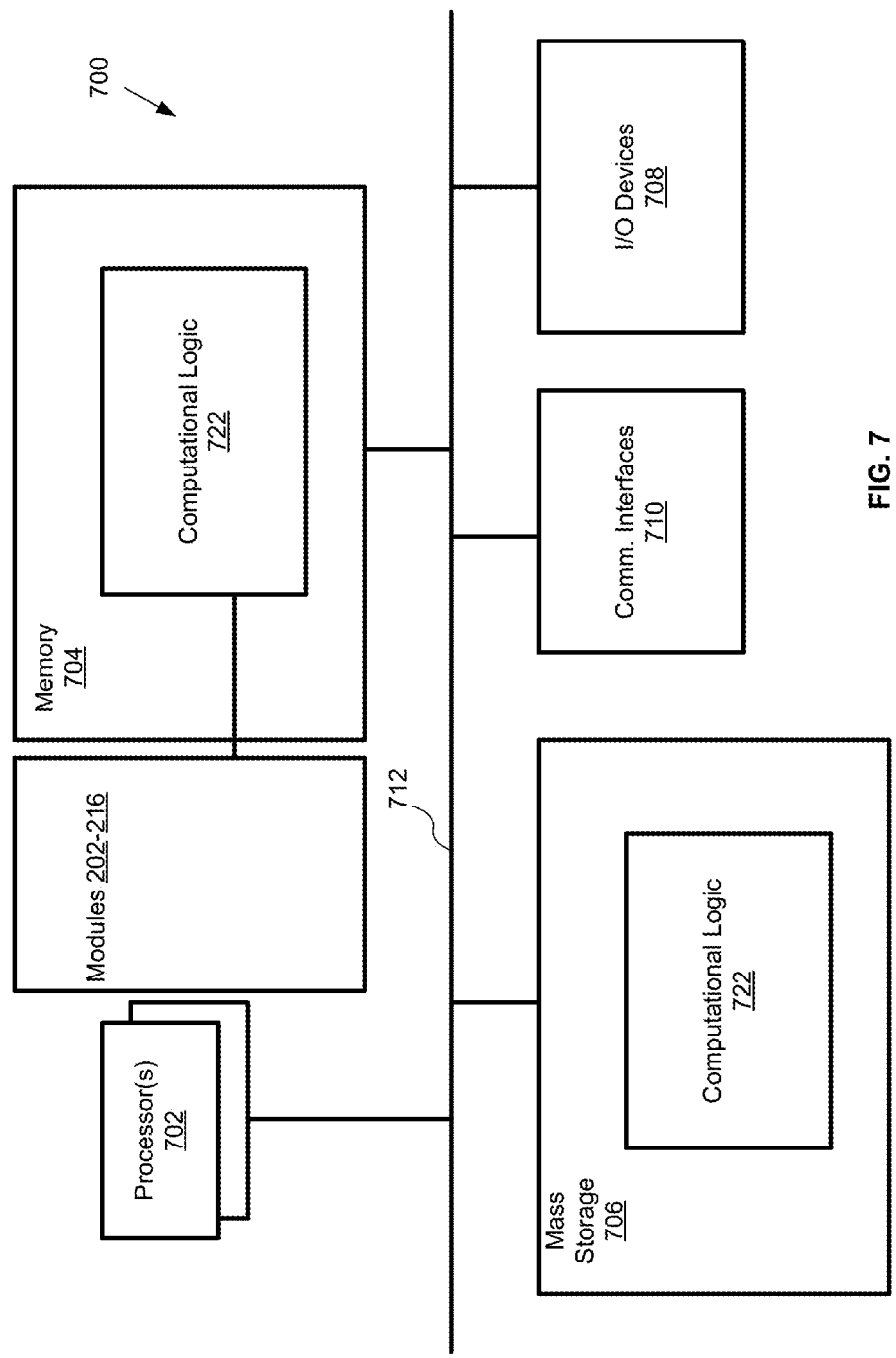
FIG. 7 illustrates an example computer device suitable for use to practice aspects of the present disclosure, according to some embodiments.

FIG. 7 illustrates an example computer device 700 suitable for use to practice aspects of the present disclosure, in accordance with various embodiments. In some embodiments, computer device 700 may comprise any of the server 104, database 104, primary device 108, and/or secondary device 110. As shown, computer device 700 may include one or more processors 702, and system memory 704. The processor 702 may include any type of processors. The processor 702 may be implemented as an integrated circuit having a single core or multi-cores, e.g., a multi-core microprocessor. The computer device 700 may include mass storage devices 706 (such as diskette, hard drive, volatile memory (e.g., DRAM), compact disc read only memory (CD-ROM), digital versatile disk (DVD), flash memory, solid state memory, and so forth). In general, system memory 704 and/or mass storage devices 706 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computer device 700 may further include input/output (I/O) devices 708 such as a microphone, sensors, display, keyboard, cursor control, remote control, gaming controller, image capture device, and so forth and communication interfaces 710 (such as network interface cards, modems, infrared receivers, radio receivers (e.g., Bluetooth)), antennas, and so forth.

The communication interfaces 710 may include communication chips (not shown) that may be configured to operate the device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments.

The above-described computer device 700 elements may be coupled to each other via a system bus 712, which may represent one or more buses. In the case of multiple buses, they may be bridged by one or more bus bridges (not shown). Each of these elements may perform its conventional functions known in the art. In particular, system memory 704 and mass storage devices 706 may be employed to store a working copy and a permanent copy of the programming instructions implementing the operations associated with system 100, e.g., operations associated with providing one or more of modules 202-216 as described above, generally shown as computational logic 722. Computational logic 722 may be implemented by assembler instructions supported by processor(s) 702 or high-level languages that may be compiled into such instructions. The permanent copy of the programming instructions may be placed into mass storage devices 706 in the factory, or in the field, through, for example, a distribution medium (not shown), such as a compact disc (CD), or through communication interfaces 710 (from a distribution server (not shown)).

In some embodiments, one or more of modules 202-216 may be implemented in hardware integrated with, e.g., communication interface 710. In other embodiments, one or more of modules 202-216 may be implemented in hardware integrated with, e.g., processor 702.

FIG. 8 illustrates an example non-transitory computer-readable storage media 802 having instructions configured to practice all or selected ones of the operations associated with the processes described above. As illustrated, non-transitory computer-readable storage medium 802 may include a number of programming instructions 804 (e.g., one or more of modules 202-216). Programming instructions 804 may be configured to enable a device, e.g., computer device 700, in response to execution of the programming instructions, to perform one or more operations of the processes described in reference to FIGS. 1-6. In alternate embodiments, programming instructions 804 may be disposed on multiple non-transitory computer-readable storage media 802 instead. In still other embodiments, programming instructions 804 may be encoded in transitory computer-readable signals.

Referring again to FIG. 7, the number, capability, and/or capacity of the elements 708, 710, 712 may vary, depending on whether computer device 700 is used as a stationary computing device, such as a set-top box or desktop computer, or a mobile computing device, such as a tablet computing device, laptop computer, game console, an Internet of Things (IoT), or smartphone. Their constitutions are otherwise known, and accordingly will not be further described.

At least one of processors 702 may be packaged together with memory having computational logic 722 (or portion thereof) configured to practice aspects of embodiments described in reference to FIGS. 1-6. For example, computational logic 722 may be configured to include or access one or more of modules 202-216. In some embodiments, at least one of the processors 702 (or portion thereof) may be packaged together with memory having computational logic 722 configured to practice aspects of processes 300, 500 to form a System in Package (SiP) or a System on Chip (SoC).

In various implementations, the computer device 700 may comprise a laptop, a netbook, a notebook, an ultrabook, a smartphone, a tablet, a smartwatch, a wearable device, an Internet of Things (IoT) device, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computer device 700 may be any other electronic device that processes data.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

Examples of the devices, systems, and/or methods of various embodiments are provided below. An embodiment of the devices, systems, and/or methods may include any one or more, and any combination of, the examples described below.

Example 1 is a first device including one or more antennas that is to receive first audio data captured by a second device; and one or more processors in communication with the one or more antennas, wherein the one or more processors is to identify a first energy level associated with the first audio data, determine, in accordance with the first energy level, a size of a buffer to be updated in the second device to capture second audio data, and detect whether one or more key phrases is included in the first audio data, wherein, when there is no detection of the one or more key phrases, the one or more processors is to determine, in accordance with second energy level associated with the second audio data, the size of the buffer to be updated in the second device to capture third audio data.

Example 2 may include the subject matter of Example 1, and may further include wherein the one or more antennas is to transmit a command, to the second device, to update the size of the buffer in accordance with the determination of the size of the buffer to be updated based on the first energy level.

Example 3 may include the subject matter of any of Examples 1-2, and may further include wherein, when the first energy level is above a threshold, the size of the buffer to be updated is smaller than a current size of the buffer.

Example 4 may include the subject matter of any of Examples 1-3, and may further include wherein, when the first energy level is below a threshold, the size of the buffer to be updated is larger than a current size of the buffer.

Example 5 may include the subject matter of any of Examples 1-4, and may further include wherein the one or more antennas is to receive the first audio data over a Bluetooth connection with the second device.

Example 6 may include the subject matter of any of Examples 1-5, and may further include wherein the first audio data includes vocal sounds from a user.

Example 7 may include the subject matter of any of Examples 1-6, and may further include wherein the one or more key phrases is associated with a voice interaction trigger, command, request, or question from a user.

Example 8 may include the subject matter of any of Examples 1-7, and may further include wherein a data packet size associated with the first audio data is different from a data packet size associated with the second audio data.

Example 9 is a computer-implemented method including identifying, at a first device, a first energy level associated with first audio data captured by a second device; determining, at the first device, in accordance with the first energy level, a size of a buffer to be updated in the second device to capture second audio data; detecting whether one or more key phrases is included in the first audio data; and, when there is no detection of the one or more key phrases, determining, at the first device, in accordance with second energy level associated with the second audio data, the size of the buffer to be updated in the second device to capture third audio data.

Example 10 may include the subject matter of Example 9, and may further include transmitting a command, to the second device, to update the size of the buffer in accordance with the determination of the size of the buffer to be updated based on the first energy level.

Example 11 may include the subject matter of any of Examples 9-10, and may further include wherein, when the first energy level is above a threshold, the size of the buffer to be updated is smaller than a current size of the buffer.

Example 12 may include the subject matter of any of Examples 9-11, and may further include wherein, when the first energy level is below a threshold, the size of the buffer to be updated is larger than a current size of the buffer.

Example 13 may include the subject matter of any of Examples 9-12, and may further include receiving, from the second device, the first audio data over a short range wireless communication connection.

Example 14 may include the subject matter of any of Examples 9-13, and may further include wherein the short range wireless communication connection comprises a Bluetooth connection.

Example 15 may include the subject matter of any of Examples 9-14, and may further include wherein the first audio data includes vocal sounds from a user.

Example 16 may include the subject matter of any of Examples 9-15, and may further include wherein the one or more key phrases is associated with a voice interaction trigger, command, request, or question from a user.

Example 17 may include the subject matter of any of Examples 9-16, and may further include wherein a data packet size associated with the first audio data is different from a data packet size associated with the second audio data.

Example 18 may include the subject matter of any of Examples 9-17, and may further include wherein the first device comprises a smartphone or a tablet, and the second device comprises a wearable device, a smartwatch, wireless earbuds, wireless headset, or a type of device different from the first device.

Example 19 is one or more computer-readable storage medium comprising a plurality of instructions to cause a first apparatus, in response to execution by one or more processors of the first apparatus, to determine whether a second apparatus wirelessly coupled to the first apparatus supports voice recognition capabilities; when the second apparatus is determined to support voice recognition capabilities, enable the voice recognition capabilities in the second apparatus; transition into a deep sleep mode; and transition out of the deep sleep mode when a voice recognition detected notification is received from the second apparatus.

Example 20 may include the subject matter of Example 19, and may further include wherein the voice recognition detected notification includes information associated with at least one voice interaction trigger, request, command, or question made by a user and detected by the second apparatus using the voice recognition capabilities.

Example 21 may include the subject matter of any of Examples 19-20, and may further include wherein to determine whether the second apparatus supports the voice recognition capabilities comprises to transmit, to the second apparatus, a service discovery request; receive, from the second apparatus, a list of voice action associated universally unique identifiers (UUIDs) supported by the second apparatus; and analyze the list to determine whether the list includes the voice recognition capabilities.

Example 22 may include the subject matter of any of Examples 19-21, and may further include wherein the plurality of instructions, in response to execution by the one or more processors of the first apparatus, further cause to establish a Bluetooth connection with the second apparatus.

Example 23 may include the subject matter of any of Examples 19-22, and may further include wherein the first apparatus comprises a smartphone or a tablet, and the second apparatus comprises a wearable device, a smartwatch, wireless earbuds, wireless headset, or a type of device different from the first device.

Example 24 is a first device including means for identifying a first energy level associated with first audio data captured by a second device; means for determining in accordance with the first energy level, a size of a buffer to be updated in the second device to capture second audio data; and means for detecting whether one or more key phrases is included in the first audio data.

Example 25 may include the subject matter of Example 24, and may further include, when there is no detection of the one or more key phrases, means for determining, in accordance with second energy level associated with the second audio data, the size of the buffer to be updated in the second device to capture third audio data.

Example 26 may include the subject matter of any of Examples 24-25, and may further include means for transmitting a command, to the second device, to update the size of the buffer in accordance with the determination of the size of the buffer to be updated based on the first energy level.

Example 27 may include the subject matter of any of Examples 24-26, and may further include wherein, when the first energy level is above a threshold, the size of the buffer to be updated is smaller than a current size of the buffer.

Example 28 may include the subject matter of any of Examples 24-27, and may further include wherein, when the first energy level is below a threshold, the size of the buffer to be updated is larger than a current size of the buffer.

Example 29 may include the subject matter of any of Examples 24-28, and may further include means for establishing a Bluetooth connection with the second device, and means for receiving the first audio data via the Bluetooth connection from the second device.

Example 30 may include the subject matter of any of Examples 24-29, and may further include wherein the one or more key phrases is associated with a voice interaction trigger, command, request, or question from a user.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

I claim:

1. A first device comprising:
one or more antennas that is to receive first audio data captured by a second device; and
one or more processors in communication with the one or more antennas, wherein the one or more processors is to identify a first energy level associated with the first audio data, determine, in accordance with the first energy level, a size of a buffer to be updated in the second device to capture second audio data, and detect whether one or more key phrases is included in the first audio data,
wherein, when there is no detection of the one or more key phrases, the one or more processors is to determine, in accordance with a second energy level associated with the second audio data, the size of the buffer to be updated in the second device to capture third audio data;
wherein, when the first energy level is above a threshold, the size of the buffer to be updated is smaller than a current size of the buffer.

2. The first device of claim 1, wherein the one or more antennas is to transmit a command, to the second device, to update the size of the buffer in accordance with the determination of the size of the buffer to be updated based on the first energy level.

3. The first device of claim 1, wherein, when the first energy level is below a threshold, the size of the buffer to be updated is larger than a current size of the buffer.

4. The first device of claim 1, wherein the one or more key phrases is associated with a voice interaction trigger, command, request, or question from a user.

5. A computer-implemented method comprising:
identifying, at a first device, a first energy level associated with first audio data captured by a second device;
determining, at the first device, in accordance with the first energy level, a size of a buffer to be updated in the second device to capture second audio data;
detecting whether one or more key phrases is included in the first audio data; and
when there is no detection of the one or more key phrases, determining, at the first device, in accordance with a second energy level associated with the second audio data, the size of the buffer to be updated in the second device to capture third audio data;
wherein, when the first energy level is below a threshold, the size of the buffer to be updated is larger than a current size of the buffer.

6. The method of claim 5, wherein, when the first energy level is above a threshold, the size of the buffer to be updated is smaller than a current size of the buffer.

7. The method of claim 5, further comprising receiving, from the second device, the first audio data over a short range wireless communication connection.

8. The method of claim 7, wherein the short range wireless communication connection comprises a Bluetooth connection.

9. The method of claim 5, wherein the one or more key phrases is associated with a voice interaction trigger, command, request, or question from a user.

10. The method of claim 5, wherein a data packet size associated with the first audio data is different from a data packet size associated with the second audio data.

11. The method of claim 5, wherein the first device comprises a smartphone or a tablet, and the second device comprises a wearable device, a smartwatch, wireless earbuds, wireless headset, or a type of device different from the first device.

12. One or more non-transitory computer-readable storage media comprising a plurality of instructions to cause a first apparatus, in response to execution by one or more processors of the first apparatus, to:
determine whether a second apparatus wirelessly coupled to the first apparatus supports voice recognition capabilities;
when the second apparatus is determined to support voice recognition capabilities, enable the voice recognition capabilities in the second apparatus;
transition into a deep sleep mode; and
transition out of the deep sleep mode when a voice recognition detected notification is received from the second apparatus;
wherein the first apparatus is further caused to:
identify a first energy level associated with first audio data captured by the second apparatus;
determine, in accordance with the first energy level, a size of a buffer to be updated in the second apparatus to capture second audio data;
wherein, when the first energy level is below a threshold, the size of the buffer to be updated is larger than a current size of the buffer.

13. The non-transitory computer-readable storage media of claim 12, wherein the voice recognition detected notification includes information associated with at least one voice interaction trigger, request, command, or question made by a user and detected by the second apparatus using the voice recognition capabilities.

14. The non-transitory computer-readable storage media of claim 12, wherein to determine whether the second apparatus supports the voice recognition capabilities comprises to:
transmit, to the second apparatus, a service discovery request;
receive, from the second apparatus, a list of voice action associated universally unique identifiers (UUIDs) supported by the second apparatus; and
analyze the list to determine whether the list includes the voice recognition capabilities.

15. The non-transitory computer-readable storage media of claim 12, wherein the plurality of instructions, in response to execution by the one or more processors of the first apparatus, further cause the first apparatus to establish a Bluetooth connection with the second apparatus.

16. A first device comprising:
means for identifying a first energy level associated with first audio data captured by a second device;
means for determining, in accordance with the first energy level, a size of a buffer to be updated in the second device to capture second audio data; and
means for detecting whether one or more key phrases is included in the first audio data;
wherein when the first energy level is above a threshold, the size of the buffer to be updated is smaller than a current size of the buffer.

17. The first device of claim 16, further comprising:
when there is no detection of the one or more key phrases, means for determining, in accordance with a second energy level associated with the second audio data, the size of the buffer to be updated in the second device to capture third audio data.

18. The first device of claim 16, wherein the one or more key phrases is associated with a voice interaction trigger, command, request, or question from a user.

* * * * *